United States Patent
Reignoux et al.

(10) Patent No.: US 7,871,011 B2
(45) Date of Patent: Jan. 18, 2011

(54) MINI-PLUG SIM CARD WITH IMPROVED POSITIONING CAPABILITY

(75) Inventors: Yves Reignoux, Clery Saint André (FR); Dorothée Nerot, Orléans (FR); François Roussel, Sceaux (FR)

(73) Assignee: Gemalto SA, Meudon Cedex (FR)

( * ) Notice: Subject to any disclaimer, the term of this patent is extended or adjusted under 35 U.S.C. 154(b) by 974 days.

(21) Appl. No.: 11/632,429

(22) PCT Filed: Jun. 20, 2005

(86) PCT No.: PCT/IB2005/001884

§ 371 (c)(1), (2), (4) Date: Jan. 12, 2007

(87) PCT Pub. No.: WO2006/008594

PCT Pub. Date: Jan. 26, 2006

(65) Prior Publication Data

US 2008/0135626 A1    Jun. 12, 2008

(30) Foreign Application Priority Data

Jul. 13, 2004   (EP) .................................. 04291850

(51) Int. Cl.
*G06K 19/05* (2006.01)
(52) U.S. Cl. ...................... 235/492; 235/441
(58) Field of Classification Search ........... 235/492, 235/487, 441, 451
See application file for complete search history.

(56) References Cited

U.S. PATENT DOCUMENTS

| 4,982,069 | A | 1/1991 | Kayanakis | |
|---|---|---|---|---|
| 6,008,993 | A | 12/1999 | Kreft | |
| 6,548,888 | B1 * | 4/2003 | Fidalgo et al. | 257/679 |
| 6,719,206 | B1 * | 4/2004 | Bashan et al. | 235/492 |
| 7,434,736 | B2 * | 10/2008 | Nicolas | 235/492 |

OTHER PUBLICATIONS

International Search Report for PCT/IB2005/01884 mailed Nov. 29, 2005 (2 pages).

\* cited by examiner

*Primary Examiner*—Daniel St.Cyr
(74) *Attorney, Agent, or Firm*—Osha Liang LLP

(57) ABSTRACT

The chip card comprises a card body and an embedded chip module having a plurality of contact fields connected to respective terminals of the chip. The card body further comprises a positioning feature adapted to univocally identify said contact fields according to their location and orientation on the card body. The positioning feature is a hole or a notch formed on the card body in an area including the chip module such as a contact field which has no electrical functionality as contact field C6 according to ISO 7816-2. The invention is particularly adapted to card bodies including a plug-in removable portion of smaller size comprising said chip module and said positioning feature such as smaller size "mini-plug" SIMs for mobile phones.

7 Claims, 1 Drawing Sheet

MINI-PLUG SIM CARD WITH IMPROVED POSITIONING CAPABILITY

BACKGROUND OF THE INVENTION

1. Field of the Invention

The present invention generally relates to chip cards of reduced size, such as the cards used in mobile phones or similar hand-held devices incorporating a chip card, like subscriber's identification cards (SIMs) used in combination with known GSM mobile phones.

2. Background Art

Most of recent mobile phones typically make use of so-called "plug-in" cards of ID-000 format as defined by ISO 7816-1 standard. The ID-000 plug-in card has a size of 25×15 mm, with a right hand corner cut off at an angle of 45° in order to facilitate the correct insertion of the card into the card reader. Correct insertion enables safe positioning of the contacts of the card with respect to the corresponding contacts of the reader of the device to which the card is coupled, for instance with respect to the contact pins of the connector or recess housing the card when such device is a mobile phone.

The plug-in card of reduced size was initially introduced to put less constraints on the design of hand-held devices for which there is no need to frequently insert and remove the subscriber's identification card.

However, due to the trend in smaller size and more compact design for present and future hand-held devices, there remains less and less available space inside the device to house the subscriber's identification card, even if the latter is in the "plug-in" ID-000 format.

There has accordingly be a recent need for a chip card of a still more reduced size, to be used in new generation hand-held devices such as mobile phones, PDAs and like miniaturized devices.

A chip card is made from a chip module supporting a chip on its backside and contact areas on its frontside, said module being embedded in a plastic body for making up the final chip card. Since it appears difficult to reduce the size of the chip module (which would involve a complete modification of the module design and of the manufacturing lines), the only possibility to reduce the size of the card essentially lies in a reduction of the size of the card body, to a dimension which is just a few tens of millimetres larger than the size of the module.

Such a reduction in size is technically possible, however there remains the problem of the correct positioning of the card in the receiving device in which it is inserted. In plug-in cards according to ID-000 standard, there is enough area around the module to provide a card with a positioning feature in the form of a cut-off corner, however if the remaining area around the module is typically less than 1 mm, provision of a cut-off corner is virtually impossible given manufacturing tolerances. There is also the fact that a chip card is generally provided with rounded corners, which make almost impossible for the user to differentiate between a rounded corner from a cut-off corner if the latter is not large enough.

SUMMARY OF THE INVENTION

It is therefore an object of the invention to provide a chip card of reduced size which includes a positioning feature enabling the user to place the chip card in the receiving device according to a single possible or orientation, even if the size of the chip card is reduced to a size that does not permit the provision of a cut-off corner as in known plug-in cards.

The card of the invention is of the type comprising a card body and a chip module incorporating a chip, said chip module being embedded in said card body and having a plurality of contact fields connected to respective terminals of the chip. The card body further comprises a positioning feature adapted to univocally identify said contact fields according to their location and orientation on the card body.

According to the invention, the above-described chip card is characterised by said positioning feature of the card body being formed on the card body in an area including, partially or totally, the chip module.

In particular, the above-mentioned area may include on the chip module a contact field, preferably a contact field which has no electrical functionality, such as contact field C6 according to ISO 7816-2.

The positioning feature may include a hole or a notch formed through the chip module and card body, preferably a circular hole with a diameter not exceeding 0.1" (2.54 mm), or a notch formed through the chip module and card body.

The invention is particularly adapted to card bodies including a plug-in removable portion of smaller size comprising said chip module and said positioning feature, in particular for a plug-in removable portion with an outer shape corresponding to the outer shape of the chip module surrounded by a peripheral rim of substantially constant width.

BRIEF DESCRIPTION OF THE DRAWINGS

The foregoing and other objects, aspects and advantages of the invention will be better understood from the following detailed description of a preferred embodiment of the invention made with reference to the appended drawings.

DETAILED DESCRIPTION OF A PREFERRED EMBODIMENT OF THE INVENTION

Figure 1:
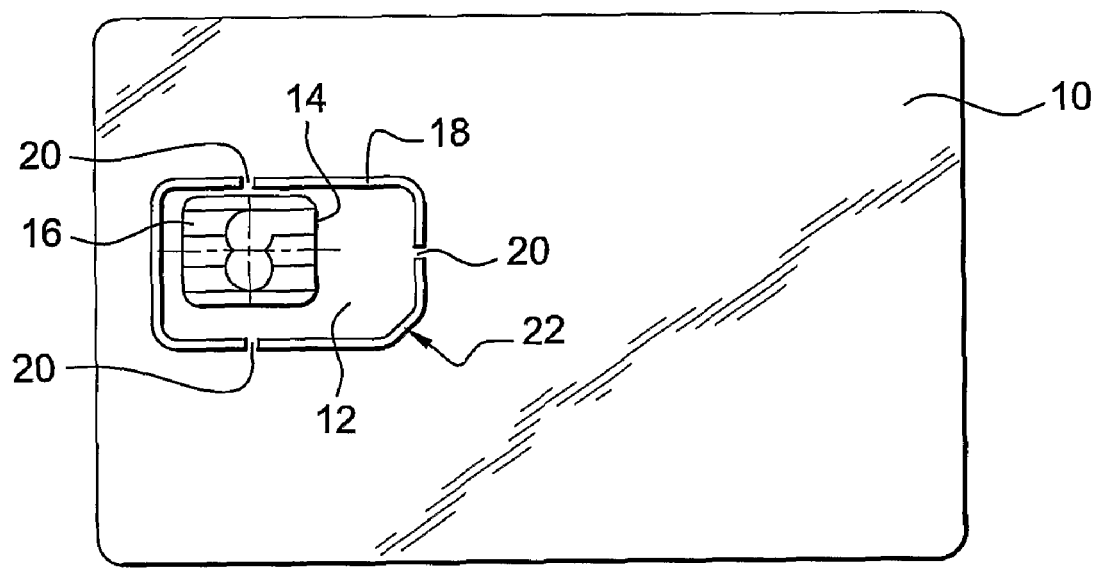
FIG. 1 is a plan view of a chip card in ID-1 format including a pre-punched portion of reduced size forming a plug-in card in known ID-000 size.

Referring now to the drawings, in FIG. 1 reference 10 generally denotes a known chip card incorporating a plug-in card.

Card 10 has a standard size of 54×85.6 mm (ID-1 format as prescribe by ISO 7816-1) with a pre-punched plug-in card 12 of smaller size bearing the chip module 14. Chip module 14 is provided with contact areas 16, typically six contacts denoted C1-C6, or eight contacts denoted C1-C8, according to ISO 7816-2.

Plug-in card 12 is surrounded by a gap 18 which has been punched when manufacturing the body of card 10, just leaving frangible segments 20 bridging plug-in card 12 to the reminder of the card, so that the client who gets pre-punched card 10 may remove plug-in card 12 by breaking off segments 20 before inserting the plug-in card in his device, for instance in his mobile phone. The size of plug-in card 12 is typically 15×25 mm according to the definition of ID-000 format prescribed by ISO 7816-1 standard.

For enabling the user to position the plug-in card in his device with the right orientation so that contact areas 16 be placed over corresponding terminals of the device, there is provided a positioning feature in the form of a cut-off at the bottom right-hand corner, specifically a 3×3 mm, 45° cut-off. Given the size of this cut-off corner, there is no difficulty for the user to find it and differentiate it from the three other corners of the plug-in card, which are rounded but with a radius of a smaller size, typically with a 1-mm radius.

Figure 2:
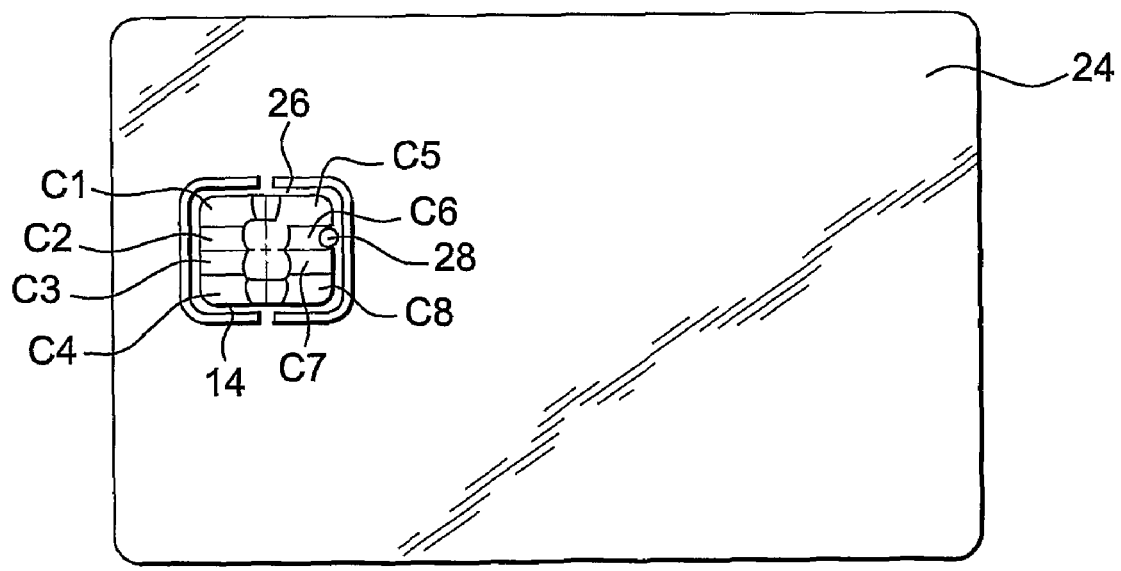
FIG. 2 is a plan view of a chip card including a including a pre-punched portion of still reduced size forming a plug-in card according to the invention.

FIG. 2 illustrates a card 24 according to the invention, designed for new generation communication devices of still reduced size and higher compactness.

Such devices require a plug-in card 26 of a size which is much more reduced than the size of ID-000 plug-in cards. Since the size of module 14 is left unchanged, the size of the plug-in card is just slightly larger than the dimensions of the module, which means that between the outline of module 14 and the outline of plug-in card 26 there just remains a very narrow peripheral rim of plastic material, typically between 0.5 and 1.5 mm, preferably less than 1.0 mm.

With such reduced dimensions, there does not remain enough space in the plug-in card body to form a cut-off corner or similar positioning feature; such feature would be so small that the user could hardly differentiate it from the other (rounded) corners of the plug-in card.

At the same time, it remains necessary to correctly identify the position of the plug-in card when inserting it into the receiving device.

The solution set forth by the invention consists in having the positioning feature as a hole or notch partly or totally formed in the area of the chip module.

The positioning feature may have any shape, for instance a triangular or rectangular notch punched in the module, or a circular through-hole bored in the module, or a recess of substantial depth formed in the thickness of the module.

In order to avoid any interference with the functionalities of the module and/or avoid that the hole or notch would reach an internal connection or bonding wire of the module, the positioning feature is preferably formed on a non-functional contact and with a size which does not exceed the size of a contact (typically a size less than 2.54 mm).

Such a non-functional contact may in particular be contact C6 as denoted by ISO 7816-2 standard. Specifically, most smart cards include eight contact fields which are referred to as C1-C4 for the left row of contacts and C5-C8 for the right row of contacts. Each contact has a proper functionality, and those contacts which are currently used are C1 (VCC), C2 (RST), C3 (CLK), C5 (GND) and C7 (I/O). C4 and C8 are considered as "RFU" (Reserved for Future Use) and C6 is a "VPP" contact, namely a contact intended for the application of an external programming voltage when writing in the memory of the chip. However, nowadays C6 is no longer used since all chips are presently manufactured under technologies that do not require application of an external, higher voltage (12V), yet may be written only by means of supply voltage VCC available through C1, or include built-in voltage multiplier circuits to provide the necessary programming voltage.

Accordingly, the positioning feature may be advantageously provided on contact C6, which choice avoids any risk of interference with the internal circuitry of the module.

Contacts C4 and C8 could be used as well for the positioning feature, however this would require that they have not any specific function, which prevents these contacts to be used in certain applications—whereas use of contact C6 has been abandoned by all manufacturers.

The invention claimed is:

1. A chip card, comprising:
 a card body, and
 a chip module incorporating a chip, said chip module being embedded in said card body and having a plurality of contact fields connected to respective terminals of the chip,
 said card body further comprising a positioning feature adapted to univocally identify said plurality of contact fields according to a location and an orientation of each of the plurality of contact fields on the card body,
 wherein said positioning feature of the card body is formed on the card body in an area occupied by the chip module, wherein said positioning feature is one selected from a group consisting of a hole and a notch, wherein said positioning feature is formed through the card body and through the chip module.

2. The chip card of claim 1, wherein said positioning feature is through a contact field of the plurality of contact fields of the chip module.

3. The chip card of claim 2, wherein said positioning feature is on a contact field of the plurality of contact fields, wherein the contact field has no electrical functionality.

4. The chip card of claim 3, wherein said contact field is contact field C6 according to ISO 7816-2.

5. The chip card of claim 1, wherein said positioning feature is a circular hole with a diameter not exceeding 0.1" (2.54 mm).

6. The chip card of claim 1, wherein said card body comprises a plug-in removable portion of smaller size than the card body, said plug-in removable portion comprising said chip module and said positioning feature.

7. The chip card of claim 6, wherein said plug-in removable portion has an outer shape corresponding to the outer shape of the chip module surrounded by a peripheral rim of substantially constant width.

\* \* \* \* \*